Feb. 16, 1965   R. H. GUTZMANN ETAL   3,169,675
METERING DISPENSING DEVICE FOR GRANULAR MATERIAL
Filed July 1, 1963   4 Sheets-Sheet 2

INVENTOR.
RAYMOND H. GUTZMANN
JOHN W. McGAVIN
BY GAUSEWITZ & CARR

ATTORNEYS

Feb. 16, 1965 R. H. GUTZMANN ETAL 3,169,675
METERING DISPENSING DEVICE FOR GRANULAR MATERIAL
Filed July 1, 1963 4 Sheets-Sheet 4

INVENTORS
RAYMOND H. GUTZMANN
JOHN M. McGAVIN
BY GAUSEWITZ & CARR
ATTORNEYS

United States Patent Office 3,169,675
Patented Feb. 16, 1965

3,169,675
METERING DISPENSING DEVICE FOR GRANULAR MATERIAL
Raymond H. Gutzmann, 11917 Gerald Ave., Granada Hills, Calif., and John M. McGavin, 7437 Sylmar Ave., Van Nuys, Calif.
Filed July 1, 1963, Ser. No. 291,738
8 Claims. (Cl. 222—360)

This invention pertains to a dispenser, and more particularly to a device for dispensing metered amounts of granular material.

Various dispensing devices have been suggested in the past for instant coffee or other granular materials. In general, however, these devices have been quite complex and expensive. Moreover, they have not always been easy to operate and usually do not afford proper protection to the contents prior to their release.

The present invention provides an improved dispenser, which is of simplified economical construction, adapted to be made entirely of molded plastic parts. In addition, it retains the granular material in a sealed container so that the stored material is kept fresh during periods between use of the device. When constructed to dispense instant coffee, the device includes a base having an opening into which a coffee cup or other receptacle may be placed. A jar of instant coffee is inserted into the upper end of the base unit and the contents drop into a hopper. An impeller wheel within the hopper is advanced through a predetermined arc upon actuation of a lever. When the actuating lever is moved in rotating the wheel, a door is opened at the bottom of the hopper to allow a metered amount of the pulverulent material to drop into the receptacle. This door is closed automatically upon release of the actuating lever, thereby sealing the contents of the hopper.

Accordingly, it is an object of this invention to provide an improved device for dispensing metered quantities of stored material.

Another object of this invention is to provide a dispensing device simple to operate and economically constructed.

A further object of this invention is to provide a dispensing device which retains material sealed from ambient conditions during periods intermediate to the dispensing of the material.

These and other objects will become apparent from the following detailed description taken in connection with the accompanying drawings in which.

Figure 1:
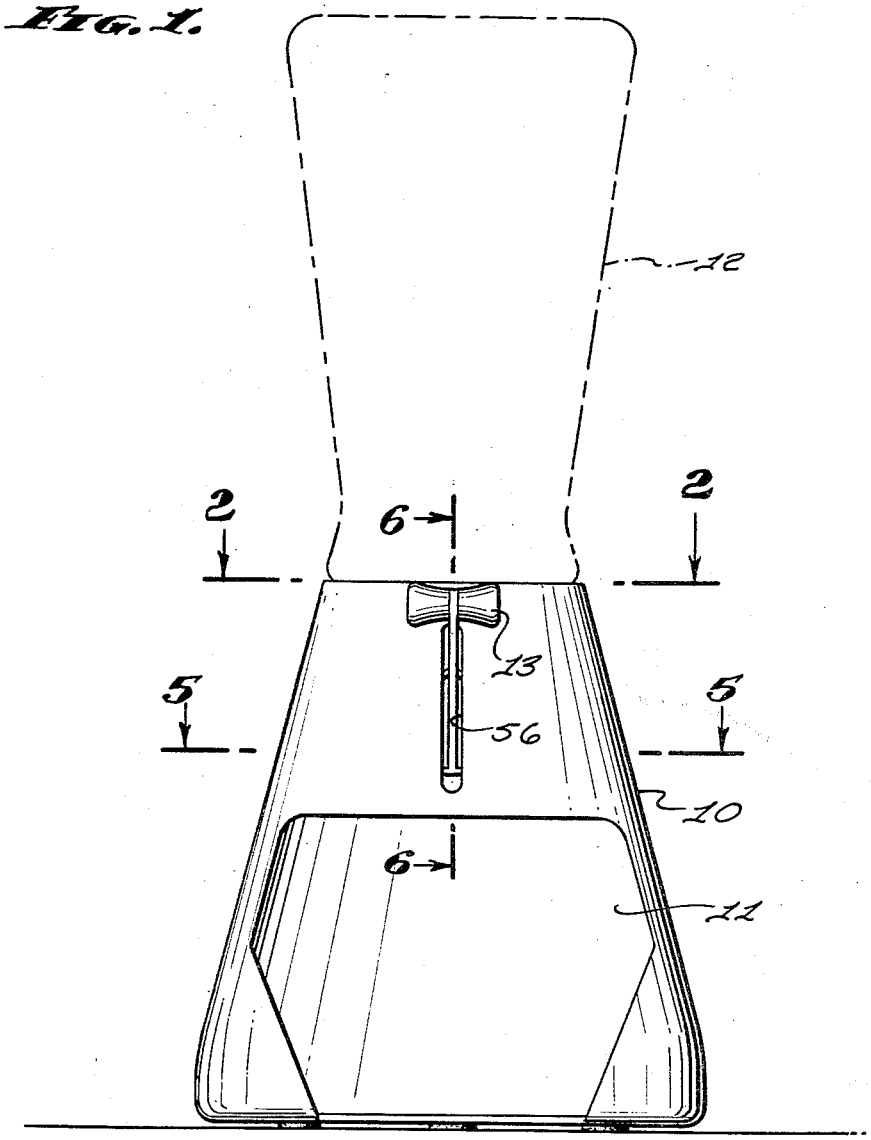
FIGURE 1 is a front elevational view of the device of this invention.
Figure 2:
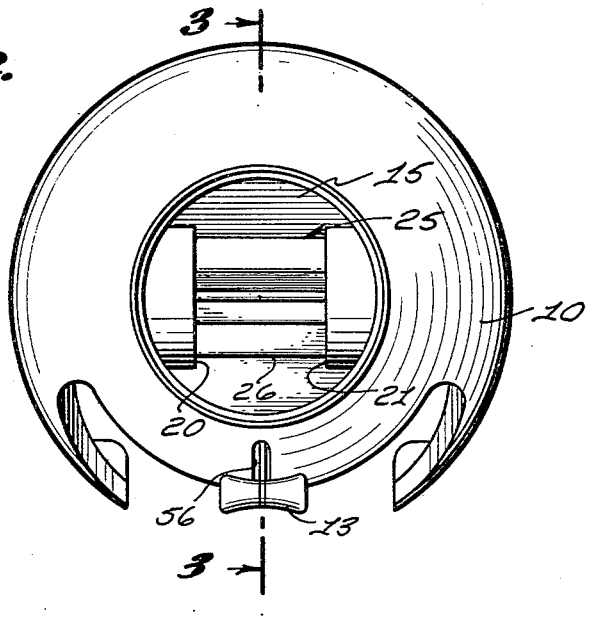
FIGURE 2 is a top plan view of the invention.
Figure 5:
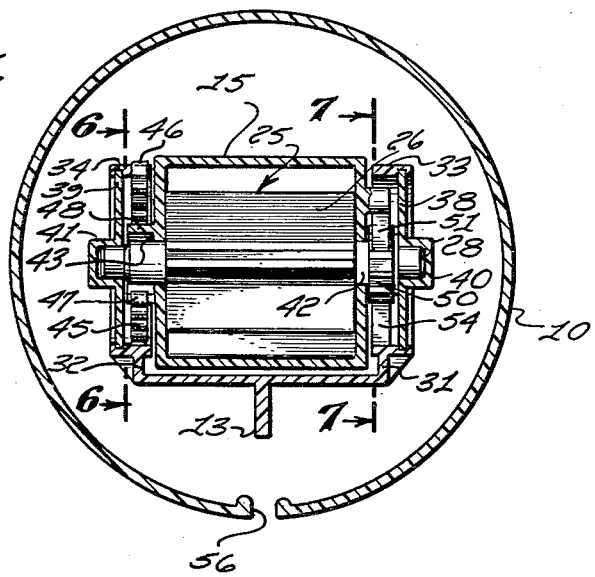
Figure 6:
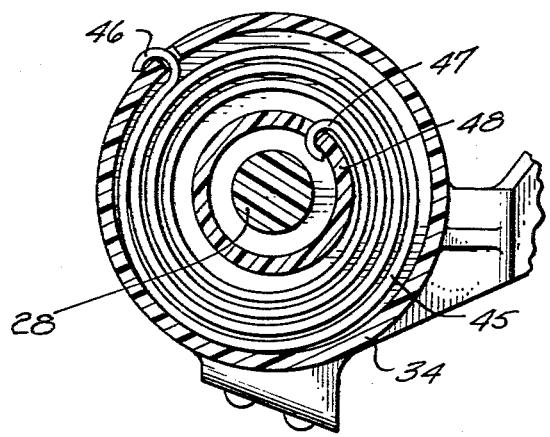
Figure 7:
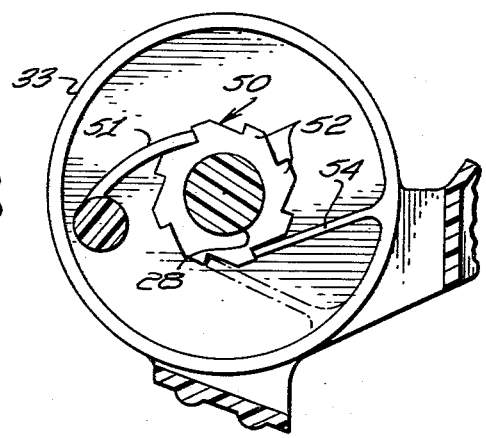
Figure 3:
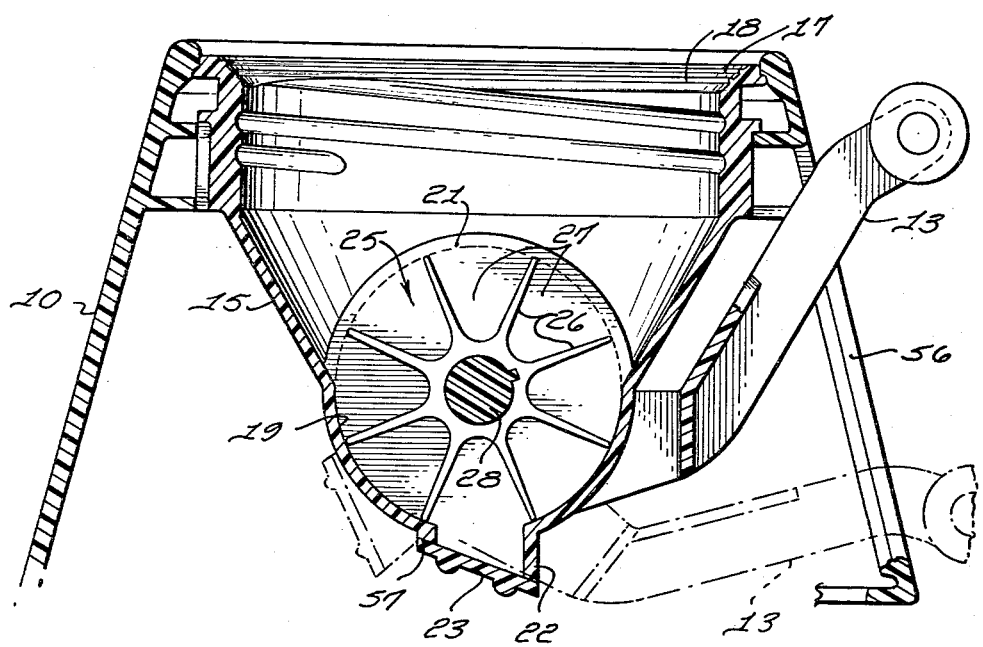
Figure 4:
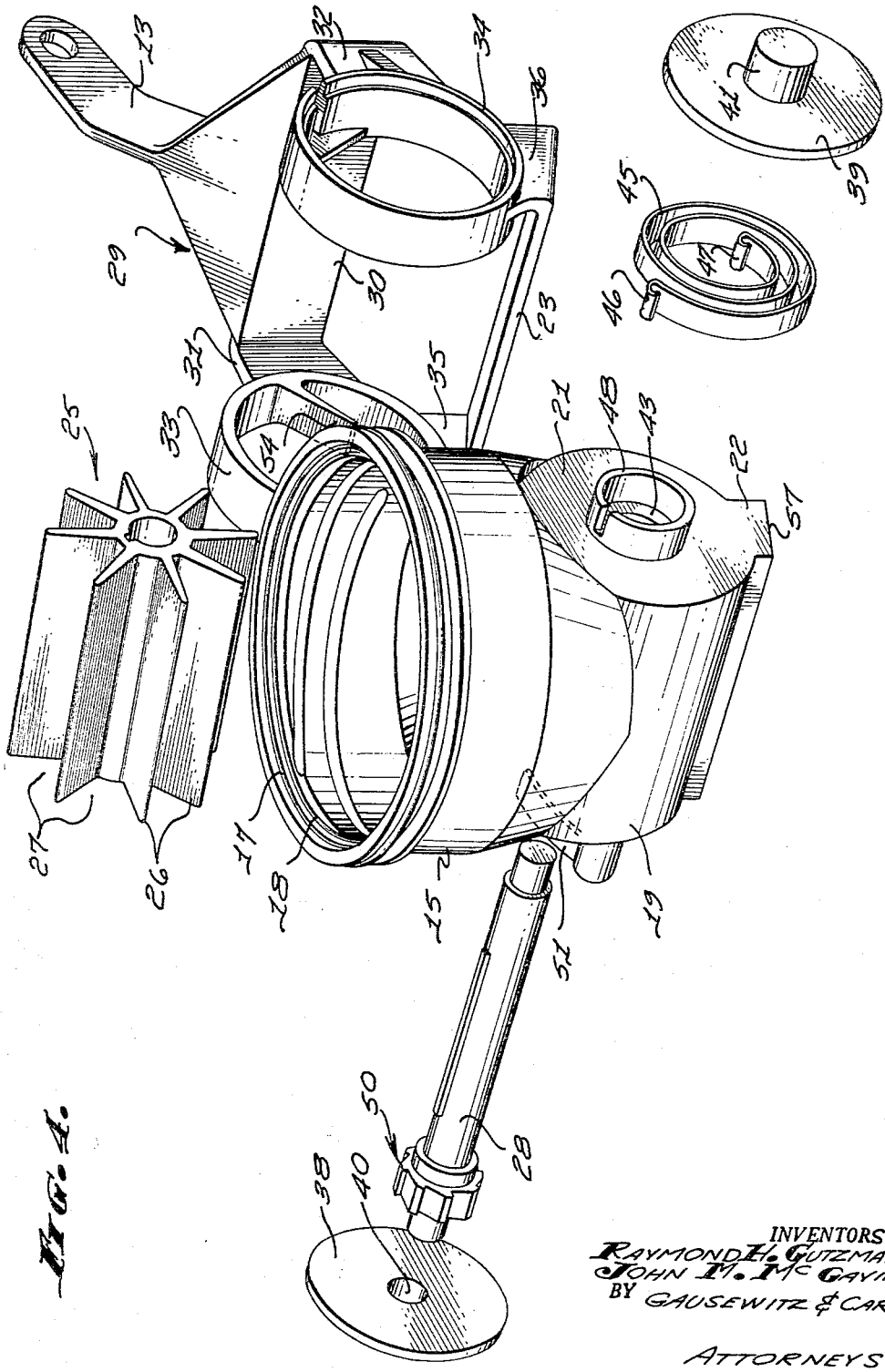

FIGURE 3 is an enlarged longitudinal sectional view taken along line 3—3 of FIGURE 2, FIGURE 4 is an exploded view of the dispenser components separated from the base, FIGURE 5 is a transverse sectional view taken along line 5—5 of FIGURE 1, FIGURE 6 is an enlarged sectional view taken along line 6—6 of FIGURE 5, illustrating the torsion spring arrangement, and FIGURE 7 is an enlarged sectional view taken along line 7—7 of FIGURE 5, showing the ratchet construction.

With reference to FIGURE 1 of the drawings, the device of this invention is illustrated as constructed for dispensing instant coffee. Hence, it includes a base 10 of generally frustoconical configuration having an aperture 11 in one wall leading to an open lower interior portion. This aperture is dimensioned to receive all standard coffee cups, regardless of the type they may be. Projecting upwardly from the top of the base 10 is an inverted jar 12 of instant coffee or other pulverulent material. A predetermined quantity of the contents of the jar 12 will drop into a cup in the base 10 upon downward movement of actuating lever 13 that is located at the front of the unit above the opening 11.

As shown in FIGURE 3, a hopper 15 is supported within the base 10 above the opening 11 and beneath the location where the jar or other receptacle 12 is positioned. When the device is made of molded plastic, the base and hopper snap together at their upper edges to result in a permanent attachment without the use of fasteners. The hopper includes screw threads adapted to receive the neck of the jar 12. In addition, at the upper end of the hopper there is an outwardly divergent shoulder provided with two upstanding annular beads 17 and 18. These help seal the contents of the jar 12 when it is threaded into the upper end of the hopper. The edge of the jar 12 adjacent its neck engages the beads 17 and 18 when the jar is screwed into place and the line contact at the beads effects a seal at this location.

The bottom wall 19 of the hopper 15 is of semi-cylindrical shape, bounded at its ends by radial walls 20 and 21. A short chute 22 at the bottom of the cylindrical wall 19 normally is closed by a door 23.

Received within the lower portion of the hopper intermediate the radial walls 20 and 21 is an impeller 25. As illustrated, this member includes eight equally spaced blades 26 defining eight pockets or receptacles 27 in between adjacent blades. The impeller 25 is keyed to a drive shaft 28 so that it is rotatable with its tips adjacent the bottom wall 19 of the hopper which is coaxial with the shaft. The ends of the blades 26 are in proximity with the end walls 20 and 21.

In general, for operating the dispenser of this invention, the impeller 25 is rotated by movement of the actuating lever 13 while the door 23 is opened simultaneously. In each cycle the impeller will be moved through 45° in the clockwise direction as seen in FIGURE 3. This will bring a pocket 27 of the impeller over the chute 22 as lid 23 is moved to the phantom line open position. The pockets 27 fill with the granular material that is introduced into the hopper from the jar 12 so that as the pockets 27 are moved successively over the chute 22 their contents are dropped to the coffee cup positioned below. The blades 26 are spaced so that they straddle the chute inlet upon each 45° increment of rotational movement. Hence, during each cycle a precisely metered amount of the contents of the jar 12 falls into the receptacle inserted into the base.

The actuating lever 13 and the closure member 23 may be made as an integral molded part 29. This unit, as seen in FIGURE 4, includes a transversely extending crosspiece 30, which upon assembly of the dispenser is adjacent the outer surface of the bottom wall 19 of the hopper. The element 30 includes inwardly bent ends 31 and 32 that connect to the circumferential walls of short axially aligned tubular segments 33 and 34. Brackets 35 and 36 depend from the tubular elements 33 and 34 connecting to the ends of the closure member 23.

The tubular segments 33 and 34 are located outside and adjacent the radial end walls 20 and 21 of the hopper 15. Discs 38 and 39 fit over the outer ends of the tubular members 33 and 34. Annular grooves in the elements 33 and 34 receive the peripheries of the discs 38 and 39 so that the discs are secured to these members. These discs include axially recessed portions 40 and 41 into which extend the distal ends of the shaft 28. This shaft passes through openings 42 and 43 in the walls 20 and 21 of the hopper, so that the hopper at these openings supports the shaft and provides bearings for it. The shaft, in turn, maintains the tubular members 33 and 34 concentric with the impeller 25. This also positions the door 23 so that it will be aligned properly with respect to the outlet at the bottom of the chute 22.

Received within the tubular element 34, as may be seen in FIGURE 6, is a torsion spring 45. The outer end 46 of this spring is given a hook shape and extended through an opening in the circumferential wall of the tubular element 34. The opposite end 47 of the torsion spring 45 is similarly formed, passing through an aperture in the hub 48 which projects from the hopper into the tubular section 34. In view of the fact that the hopper is a fixed element, the torsion spring imposes a torque on the assembly 29 that includes the closure element 23 and the actuating lever 13. This biases this assembly in the counterclockwise direction, as the device is illustrated in FIGURE 3, urging the actuating lever to the raised position shown in solid lines.

The opposite end of shaft 28, which is located in tubular portion 33 outside of the hopper wall 20, carries a toothed ratchet wheel which is rotatable with the shaft. A pawl 51 projects from the hopper assembly toward the ratchet wheel 50, normally engaging the radial edge portion of one of the eight ratchet teeth 52. Hence, the pawl 51 will preclude counterclockwise rotation of the ratchet wheel 50 and, therefore, the shaft 28 as the device is shown in FIGURE 7.

A second pawl 54 also engages the radial surface of a ratchet tooth 52, contacting the tooth diametrically opposed to the tooth engaged by fixed pawl 51. The pawl 54 extends inwardly from the circumferential wall of the tubular section 33 and is rotatable with that element.

In operation of the dispensing device of this invention, the actuating lever 13 is pushed downwardly as permitted by the slot 56 in the base 10 through which it extends. This movement of the lever is made in opposition to the force of the torsion spring 45, which tends to rotate the lever in the opposite direction as described above. As the lever moves downwardly (clockwise in FIGURE 3) it rotates the tubular end portions 33 and 34. Consequently, the pawl 54 carried by the tubular element 33 turns the ratchet wheel 50. This is because the pawl 54 engages the radial surface of a ratchet tooth 52 and, through the tooth, drives the ratchet wheel. The movement of the pawl 54 and rotation of the ratchet wheel 50 causes an equal rotation of the shaft 28 that carries the impeller 25. Therefore, the impeller is turned as the lever is depressed. Slot 56 is dimensioned so that when the lever reaches the bottom of the slot it will have moved the shaft 28 through a 45° arc. This will move one of the pockets 27 of the impeller 25 to a position over the chute 22 for discharge of the contents of the hopper downwardly. Of course, the door 23 is shifted out of position beneath the end of the chute by the movement of the lever 13, being caused to assume the phantom line position of FIGURE 3. The scarfed bottom edge 57 of the chute 22 allows this movement of the member 23 to take place. This edge slants radially inward across its width toward the direction of movement of member 23, which rotates about the axis of the shaft 28. There is clearance for rotational movement of the closure member 23, which takes place automatically as the lever 13 is depressed. Simultaneously, the impeller is moved through a predetermined arc to discharge an exact amount of pulverulent material from the chute 22.

Upon release of the lever 13, the torsion spring 45 will return the lever to its initial raised position. There it is ready for use in again dispensing a quantity of the contents of the hopper. The impeller is precluded from such reverse movement, however, by virtue of the fact that pawl 51 locks it against counterclockwise rotation. As the ratchet wheel is turned in the clockwise direction, the next tooth 52 will be brought into engagement with the end of the pawl 51 so that the pawl 51 can prevent the ratchet wheel from moving in the opposite direction. Of course, the pawl 54 merely slides over the tooth that it moved when it is returned to its retracted position.

From the foregoing it can be seen that the device of this invention is operated quite easily in dispensing an exact quantity of material. Conveniently, the pockets 27 of the impeller may be dimensioned to hold appropriate quantities of instant coffee to correspond to the requirements of most coffee drinkers. For example, a cup of relatively weak coffee would require moving the lever 13 through one cycle, while coffee of normal strength would require two actuations of the lever. For strong coffee it can be moved three times.

Of particular significance is the fact that the door 23 at the bottom end of the chute is moved out of the way automatically when the lever is actuated, but is returned to cover the end of the chute when the cycle has been completed. This is not needed in order to prevent further discharge from the chute because the impeller blades defining the pocket above the chute will have been emptied by the depression of the lever, and the remainder of the material in the hopper will be prevented from falling out by the impeller blades. However, it is important in assuring that the contents of the hopper are sealed. It is necessary to provide a small clearance at the periphery of the impeller in order to permit its rotation. Without the closure element 23, therefore, air could readily circulate over the tips of the impeller blades 26 and into the contents of the hopper and the jar 12. However, with the closure element 23 returned over the bottom end of the chute 22 such free air movement is precluded. The torsion spring biasing the unit in the counterclockwise direction urges the door 23 into firm contacting relationship with the bottom edge of the chute. Hence, the lid member 23 always is held tightly over the opening at the bottom of the hopper when the device is not in use.

The foregoing detailed description is to be clearly understood as given by way of illustration and example only, the spirit and scope of this invention being limited solely by the appended claims.

We claim:

1. A dispensing device comprising
    a hopper,
    an impeller,
        said impeller including a plurality of outwardly extending blades defining pockets of predetermined volume between adjacent blades,
    means rotatably mounting said impeller in said hopper adjacent the bottom wall of said hopper,
        said hopper having an opening in said bottom wall,
        the blades on said impeller being spaced such that adjacent blades can straddle said opening in said bottom wall,
    a closure member normally closing said opening,
    an actuating member reciprocative through a rotary stroke from a retracted position relative to said housing,
        said actuating member being connected to said closure member and operative to move said closure member away from said opening upon movement of said actuating member in one direction through its stroke,
            and to return said closure member to said opening upon movement of said actuating member in the opposite direction,
        said closure member including a plate longitudinally in parallelism with the axis of said impeller,
            said plate being inclined radially inward with respect to said axis from a trailing edge to a leading edge on the side of said closure member facing in the direction of rotation of said plate upon said movement of said actuating member in said one direction,
        said opening being inclined so as to complementarily engage said plate when said actuating member is in its retracted position,
    and drive means interconnecting said actuating member and said impeller for rotating said impeller only during movement of said actuating member in said one direction.

2. A dispensing device comprising
    a hopper,
    an impeller, said impeller including a plurality of outwardly extending blades defining pockets of predetermined volume between adjacent blades, means rotatably mounting said impeller in said hopper adjacent the bottom wall of said hopper, said hopper having an opening in said bottom wall, the blades on said impeller being spaced such that adjacent blades can straddle said opening in said bottom wall, a closure member normally closing said opening, an actuating member reciprocative through a rotary stroke from a retracted position relative to said housing, said actuating member being connected to said closure member and operative to move said closure member away from said opening upon movement of said actuating member in one direction through its stroke, and to return said closure member to said opening upon movement of said actuating member in the opposite direction, and drive means interconnecting said actuating member and said impeller for rotating said impeller only during movement of said actuating member in said one direction, said actuating member and said closure member being simultaneously rotatable about the axis of said impeller upon the movement of said actuating member through its stroke, said drive means including a ratchet for effecting said rotation of said impeller only during said movement of said actuating member in said one direction.

3. A device as recited in claim 2 including in addition resilient means biasing said actuating member toward said retracted position.

4. A dispenser comprising a hopper, said hopper having a lower wall defined by a cylindrical segment and opposed end walls radially arranged with respect to said lower wall, a chute depending from said lower wall, said chute having an outlet opening therein, an impeller in said housing, said impeller having a plurality of substantially radially extending equally spaced blades, means rotatably mounting said impeller in said housing intermediate said end walls and coaxial with said lower wall, the peripheral edges of said blades being rotatable across said lower wall in proximity therewith, and the ends of said blades being in proximity with said end walls, said blades being spaced such that in successive predetermined rotational positions adjacent pairs of blades straddle said chute, a closure member over said outlet opening, said closure member being rotatable about the axis of rotation of said impeller, and actuating means for rotating said impeller incrementally to said predetermined positions, said actuating means including means for effecting such rotation of said closure member for moving said closure member away from said outlet opening during said rotation of said impeller.

5. A dispenser comprising a hopper, said hopper having a lower wall defined by a cylindrical segment and opposed end walls radially arranged with respect to said lower wall, a chute depending from said lower wall, said chute having an outlet opening therein, an impeller in said housing, said impeller having a plurality of substantially radially extending equally spaced blades, means rotatably mounting said impeller in said housing intermediate said end walls and coaxial with said lower wall, the peripheral edges of said blades being rotatable across said lower wall in proximity therewith, and the ends of said blades being in proximity with said end walls, said blades being spaced such that in successive predetermined rotational positions adjacent pairs of blades straddle said chute, a closure member over said outlet opening, said outlet opening having a rectangular outer edge in spaced parallelism with said axis of said shaft, said edge being inclined radially inward toward the side thereof located forwardly with respect to said rotation in said one direction, said closure member being a rectangular element having a surface complementarily engageable with said edge, and actuating means for rotating said impeller incrementally to said predetermined positions, said actuating means including means for moving said closure member away from said outlet opening during said rotation.

6. A dispenser comprising a hopper, said hopper having a lower wall defined by a cylindrical segment and opposed end walls radially arranged with respect to said lower wall, a chute depending from said lower wall, said chute having an outlet opening therein, an impeller in said housing, said impeller having a plurality of substantially radially extending equally spaced blades, means rotatably mounting said impeller in said housing intermediate said end walls and coaxial with said lower wall, said means rotatably mounting said impeller in said housing including a shaft extending through said end walls, the peripheral edges of said blades being rotatable across said lower wall in proximity therewith, and the ends of said blades being in proximity with said end walls, said blades being spaced such that in successive predetermined rotational positions adjacent pairs of blades straddle said chute, a closure member over said outlet opening, and actuating means for rotating said impeller incrementally to said predetermined positions, said actuating means including an assembly carrying said closure member and rotatable about the axis of said shaft, a ratchet wheel on one end of said shaft, a drive pawl carried by said assembly and engaging said ratchet wheel for effecting rotation of said wheel in one direction, thereby to rotate said shaft and said impeller, a fixed pawl engaging said ratchet wheel for precluding rotation thereof in the opposite direction, and resilient means biasing said assembly rotationally in said opposite direction.

7. A device as recited in claim 6 in which said resilient means is a torsion spring engaging said assembly and said hopper for imposing a torque on said assembly.

8. A dispenser comprising a hopper, said hopper having a lower wall defined by a cylindrical segment and opposed end walls radially arranged with respect to said lower wall, a chute depending from said lower wall,
  said chute having an outlet opening therein,
an impeller in said housing,
  said impeller having a plurality of substantially radially extending equal spaced blades,
means rotatably mounting said impeller in said housing intermediate said end walls and coaxial with said lower wall,
  the peripheral edges of said blades being rotatable across said lower wall in proximity therewith, and the ends of said blades being in proximity with said end walls,
    said blades being spaced such that in successive predetermined rotational positions adjacent pairs of blades straddle said chute,
a closure member over said outlet opening,
actuating means for rotating said impeller incrementally to said predetermined positions,
  said actuating means including lever means for moving said closure member away from said outlet opening during said rotation,
    said lever means being integrally connected to said closure member,
and resilient means engaging said lever means and biasing the same to a position where said closure member is in firm substantially sealing engagement with said chute at said outlet opening.

References Cited by the Examiner
UNITED STATES PATENTS

| | | | |
|---|---|---|---|
| 853,768 | 5/07 | Caviglia | 222—360 |
| 1,727,320 | 9/29 | Wolfe | 222—360 X |
| 1,768,826 | 7/30 | Campbell | 222—360 |
| 1,778,845 | 10/30 | Brunhoff | 222—360 X |
| 1,929,788 | 10/33 | Myers et al. | 222—360 X |
| 1,973,566 | 9/34 | Hanson | 222—360 X |
| 3,047,184 | 7/36 | Gray | 222—360 X |

LOUIS J. DEMBO, *Primary Examiner.*